(12) United States Patent
Cragun

(10) Patent No.: US 7,904,523 B2
(45) Date of Patent: *Mar. 8, 2011

(54) INTELLIGENT DELAYED BROADCAST METHOD AND APPARATUS

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/181,820

(22) Filed: Jul. 29, 2008

(65) Prior Publication Data

US 2008/0281935 A1 Nov. 13, 2008

Related U.S. Application Data

(63) Continuation of application No. 10/375,759, filed on Feb. 26, 2003, now Pat. No. 7,469,041.

(51) Int. Cl.
G06F 15/16 (2006.01)
(52) U.S. Cl. .................. 709/206; 379/92.01; 379/88.16; 379/88.22; 379/92.02; 379/92.04; 705/10; 707/1
(58) Field of Classification Search .................. 709/206; 379/92.01, 88.16, 88.22, 92.02, 92.04; 705/10; 707/11, 1
See application file for complete search history.

(56) References Cited

U.S. PATENT DOCUMENTS

| 5,568,612 | A | 10/1996 | Barrett et al. |
| 5,842,195 | A | 11/1998 | Peters et al. |
| 6,014,427 | A | 1/2000 | Hanson et al. |
| 6,014,429 | A * | 1/2000 | LaPorta et al. ............. 379/88.15 |
| 6,029,195 | A * | 2/2000 | Herz ............................. 725/116 |
| 6,256,614 | B1 * | 7/2001 | Wecker et al. ............. 705/14.19 |
| 6,519,629 | B2 | 2/2003 | Harvey et al. |
| 6,677,968 | B1 | 1/2004 | Appelman |
| 6,954,136 | B2 * | 10/2005 | Sauer .......................... 340/7.46 |
| 2002/0007303 | A1* | 1/2002 | Brookler et al. ................ 705/10 |
| 2002/0111854 | A1 | 8/2002 | Yotam et al. |
| 2003/0018558 | A1 | 1/2003 | Heffner et al. |
| 2003/0137401 | A1* | 7/2003 | Sauer .......................... 340/7.46 |
| 2003/0161268 | A1 | 8/2003 | Larsson et al. |
| 2003/0233337 | A1 | 12/2003 | Yanase et al. |
| 2004/0019637 | A1 | 1/2004 | Goodman et al. |
| 2004/0019645 | A1 | 1/2004 | Goodman et al. |

OTHER PUBLICATIONS http://www.community.ngi.ibm.com, "IBM Community Tools", printed Feb. 20, 2003.

* cited by examiner

*Primary Examiner* — Vivek Srivastava
*Assistant Examiner* — William J Goodchild
(74) *Attorney, Agent, or Firm* — Grant A. Johnson

(57) ABSTRACT

A method, system, and article of manufacture that improves the chance of getting an answer to a broadcast chat by sending the messages in subscribers in periodically delayed groups. If a group of subscribers does not produce enough suitable answers, the present invention will then rebroadcast the inquiry to another group of subscribers. This process will continue until enough suitable answers are received.

18 Claims, 10 Drawing Sheets

| MESSAGE_ID | MESSAGE_TEXT | UNANSWERABLE | ROUND COUNT | ACCEPTED ANSWERS | FIRST_CONTACT | NEW_REQUEST |
|---|---|---|---|---|---|---|
| 174 | 176 | 178 | 180 | 184 | 186 | 188 |

FIG. 1D

INTELLIGENT DELAYED BROADCAST METHOD AND APPARATUS

CROSS-REFERENCE TO RELATED APPLICATION

This application is a continuation of co-pending U.S. patent application Ser. No. 10/375,759, filed Feb. 26, 2003, which is herein incorporated by reference in its entirety.

TECHNICAL FIELD

The present invention relates to digital communication systems, and in particular, to instant message broadcast systems between multiple users connected to a computer network.

BACKGROUND

The latter half of the twentieth century has been witness to a phenomenon known as the information revolution. While the information revolution is a historical development broader in scope than any one event or machine, no single device has come to represent the information revolution more than the digital electronic computer. Each year, computer systems grow faster, store more data, and provide more applications to their users. Thus, information that was too expensive to gather, store and process a few years ago, is now economically feasible to collect and manipulate via computer. These reduced costs, in turn, have driven tremendous increases in worker productivity, as product designs, manufacturing processes, resource scheduling, administrative chores, and many other factors, are made more efficient.

Today, most computer systems used in commercial business environments are now connected to each other by some type of network, such as an intranet or the Internet, that to allow employees to communicate with each other electronically. In many environments, this is an essential part of these workers' respective jobs. This trend is a logical consequence of the information revolution because information is most useful when it is shared.

Instant messaging is a type of computer application that is designed to facilitate communication among multiple computer users attached to a network. Instant messaging may be implemented in various ways, but in general it supports the sending and receiving of messages that appear on the computer display of the recipient more or less instantly after being sent, as opposed to the more traditional e-mail messages, which typically are logged until the recipient wishes to view them. This characteristic gives instant messaging a more spontaneous, conversational quality than traditional e-mail, and thus helps to provide an alternative form of communication using computers attached to a network. Such communication may be used by a variety of users, from groups of individuals working closely together on some critical project, to more casual users at home who simply want to see who is available to receive a message immediately.

Real-time textual conversations, commonly known as "chats," have become popular among both personal and business computer users. Chats occur as conversations using instant messages between two people, as conferences among larger groups, and in persistent chat rooms or spaces accessible to a larger community who can drop in, read what was recently written, and contribute if they desire.

The textual nature of chat makes it particularly valuable in some settings. Chat can be conducted while people are on the phone, allowing it to be used as a second channel for exchanging information. Moreover, because of the persistent nature of text, a user can catch up on anything that was said in a chat if they were momentarily distracted or interrupted. Chat can also be an inexpensive and lightweight way for people to exchange information in real time. These and other reasons contribute to the growing use of chat in business settings and the increasing incorporation of chat into the offerings of major software manufacturers.

GINIE™ is a software application developed by International Business Machines, Inc. of Armonk, N.Y., that extends traditional instant messaging chatting into the enterprise. GINIE is essentially a pluggable, shared communication bus that is both robust and fully extendable. One of the uses of GINIE technology is an end-to-end publish/subscribe (pub-sub) architecture called SHOTGUN™ that allows users to broadcast questions or announcements over an instant messaging "channel" to a large number of listeners. Like television or radio broadcasting, users can "tune in" to these channels—or even on several channels at one time—to listen for messages. These channels can be either public or private. Anyone can listen into the public channel. Any group, organization, or community can create a private channel to ask questions and discuss issues within itself.

One of the particular applications of the SHOTGUN architecture is SKILLTAP™, also developed by International Business Machines, Inc. In the SKILLTAP application, a user can broadcast a question to all listening individuals in the hope that one will respond to the question. Each SKILLTAP client subscribed to the channel places the question on the user's screen for a few seconds. If the user knows the answer, they can respond. If the user does not know the answer, does not have time to answer the question, or are not at their desk, the question is automatically removed from the screen after a brief display period.

Unlike conventional instant messaging techniques, SHOTGUN and SKILLTAP broadcast questions to all the subscribers at the same time, regardless of the number. Thus, if a user broadcasts a question over the SHOTGUN broadcast system, the question will appear on countless screens at the same time, and any number of individuals may respond. However, this feature creates the risk that people will stop responding to inquiries if the system is overused and the risk that the asker will become overwhelmed with responses. Thus, a widespread, simultaneous SKILLTAP broadcast may actually decrease in effectiveness as the number of users increases—a remarkable contrast to the typical Internet effect.

One partial solution to this problem is to impose an arbitrary limit on the number of users who will receive the broadcast and to limit the number of responses the asker receives. One problem with this approach, however, is that the broadcast may miss the person who can best answer the question. Another problem with this approach is that there is no guarantee that anyone will respond. Still another problem is that participants who receive questions have no indication of whether someone else has responded. Thus, a particularly knowledgeable participant may not respond because they believe someone, or everyone, else will respond.

Without a method that reduces the potential annoyance factor, decreases the potential for duplicative effort, and improves the chance of getting an answer, the promise of broadcast technology may never be reached.

SUMMARY OF THE INVENTION

The present invention improves the chance of getting an answer to a broadcast chat by sending the messages in groups of periodically delayed requests. In this way, an inquiry will first be sent to a subset of the subscribers. If this subset does not produce enough suitable answers, the present invention will then rebroadcast the inquiry to another subset of subscribers. This process will continue until enough suitable answers are received, at which time the present invention will stop sending the inquiry. Consequentially, other subscribers do not waste time reading and/or answering a question that has already been satisfactorily answered.

Accordingly, one aspect of the present invention is a broadcast messaging method comprising receiving a message for a plurality of subscribers and broadcasting the message to a first subset of the plurality of subscribers. In some embodiments, the message is an inquiry and the method further comprises receiving an answer to the inquiry, transmitting the answer to an original sender, receiving an approval or rejection of the answer from a sender of the inquiry, and broadcasting the message to a second subset of the plurality of subscribers if the sender does not approve the answer.

Another aspect of the present invention is a method of polling a plurality of subscribers to a broadcast messaging system. One embodiment of this method comprises receiving an inquiry from a sender, broadcasting the inquiry to a first subset of the plurality of subscribers receiving an answer to the inquiry, receiving an answer to the inquiry from one subscriber in the first subset of subscribers, transmitting the answer to the sender, and broadcasting the inquiry to a second subset of the plurality of subscribers if the sender does not approve the answer.

Yet another aspect of the present invention is a message broadcast system. One embodiment of this system comprises a processor, a memory coupled to the processor, and a broadcast server stored in the memory and executable on the processor. The broadcast server in this embodiment receives inquiries of a plurality of subscribers to a message broadcast system and transmits the inquiries to a first subset of the plurality of subscribers. Some broadcast server embodiments may further comprise a first broadcast client that transmits the message to the broadcast server and a second broadcast client that receives the message from the broadcast server.

Yet another aspect of the present invention comprises a computer program product comprising a program configured to perform a method a broadcast messaging method and a signal bearing media bearing the program. One embodiment of the broadcast message method comprises receiving a message for a plurality of subscribers and broadcasting the message to a first subset of the plurality of subscribers. Some embodiments may further comprise receiving an answer to the inquiry, transmitting the answer to an original sender, and broadcasting the message to a second subset of the plurality of subscribers if the original sender does not approve the answer.

The present invention offers numerous advantages over conventional broadcast systems. For example, the present invention and its broadcast waves greatly reduce interruptions for subscribers because the broadcast stops after the sender receives an answer and because the present invention spreads out the broadcast waves among the subscribers. The present invention also improves the chance that a sender will receive an answer to an inquiry because subscribers are not interrupted as often and because the broadcast is automatically repeated if the sender does not receive an answer. These and other features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention may be had by reference to the embodiments thereof that are illustrated in the appended drawings.

FIG. 1D depicts a data structure for a broadcast database.

It is to be noted that these drawings illustrate only typical embodiments of this invention and are therefore not to be considered limiting of its scope, for the invention may admit to other equally effective embodiments.

DETAILED DESCRIPTION

Figure 1A:
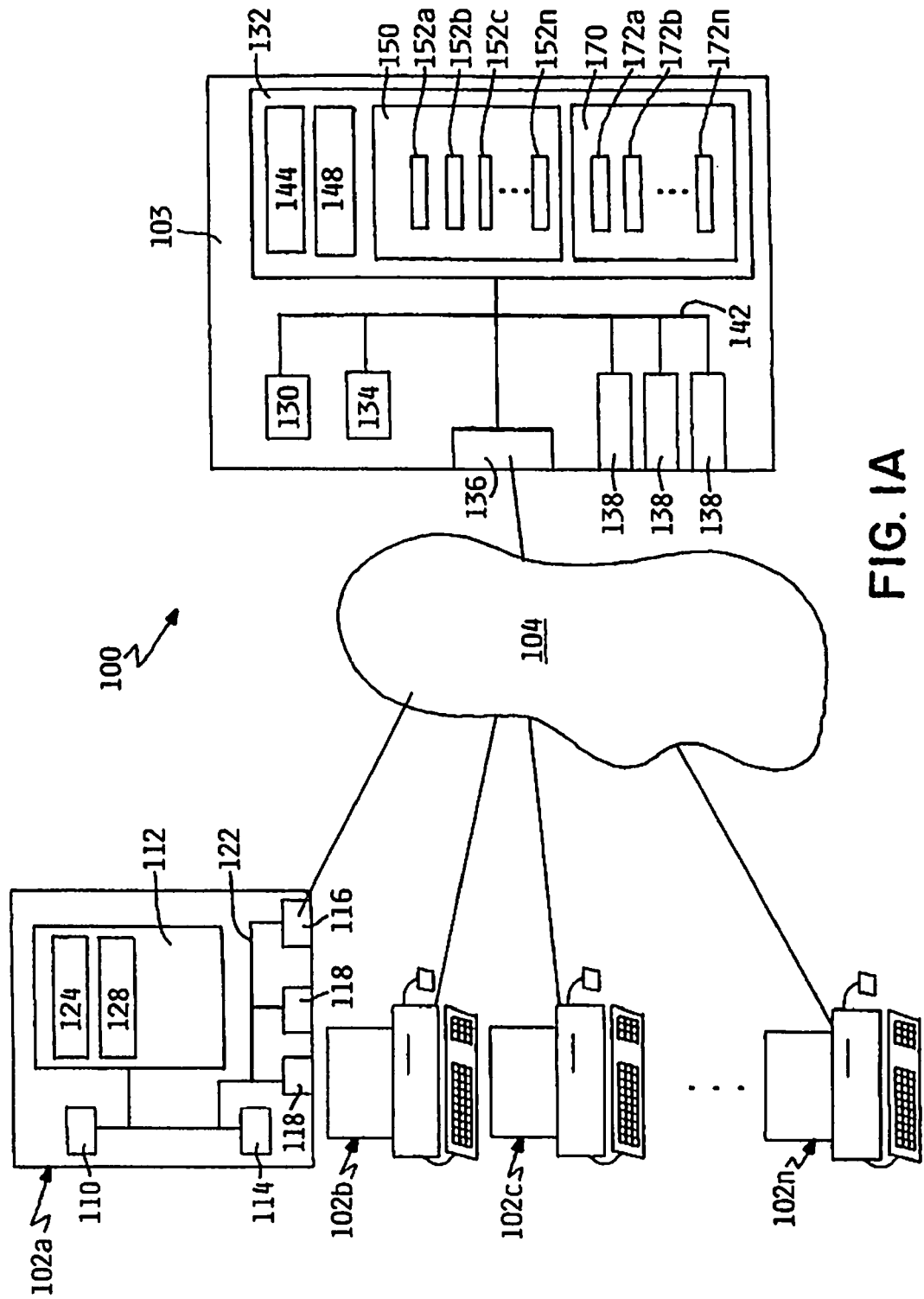
FIG. 1A depicts a message broadcast system embodiment in accordance with the present invention.

FIGS. 1A-1D show an instant messaging broadcast system 100 embodiment in accordance with the present invention. As best shown in FIG. 1A, this broadcast system 100 embodiment comprises a plurality of client computers 102 (for clarity, only one shown in detail) connected to a server computer 103 by an appropriate communications medium 104. Each of the client computers 102 comprises a central processing unit 110 connected to a main memory 112, a mass storage interface 114, a network interface 116, and an input/output ("I/O") interface 118 by a system bus 122. The memory 112 in each client computer 102 comprises an operating system 124 and an instant messaging broadcast client 128. The server computer 103 similarly includes a central processing unit 130 connected to a main memory 132, a mass storage interface 134, a network interface 136, and an I/O interface 138 by a system bus 142.

Figure 1B:
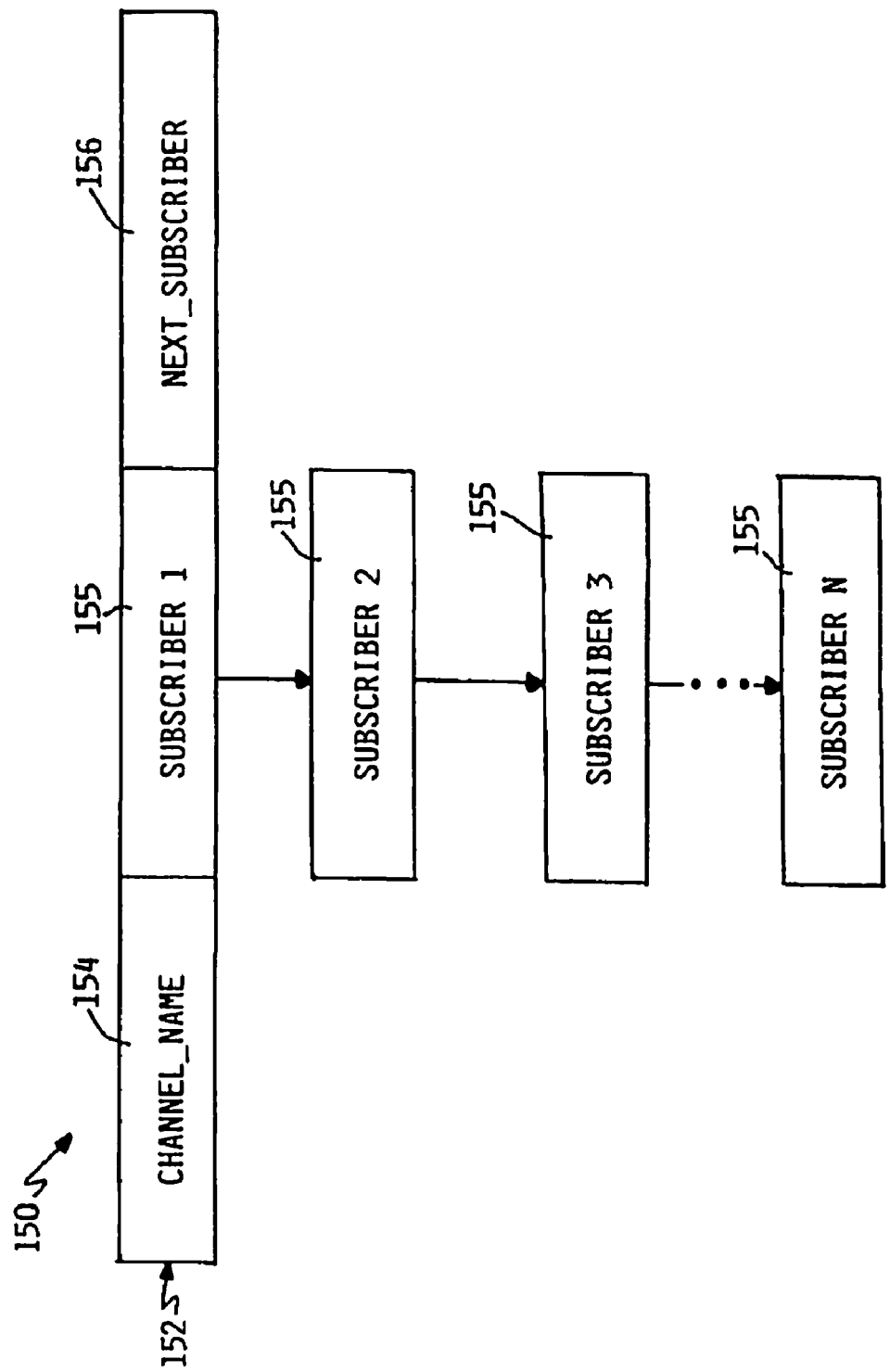
FIG. 1B depicts a data structure for a channel database.
Figure 1C:
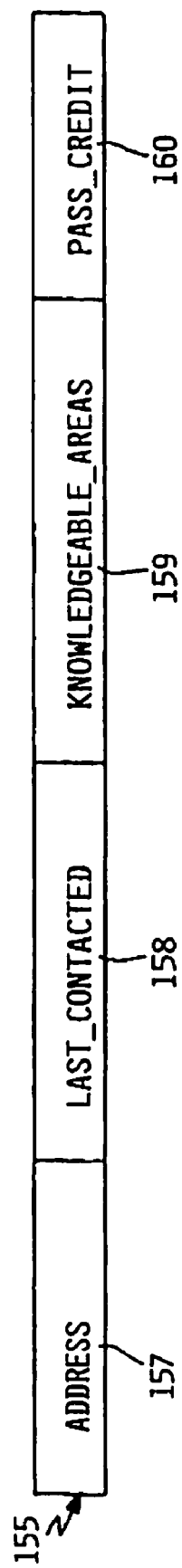
FIG. 1C depicts a data structure for a subscriber record.

The memory 132 in the server computer 103 contains an operating system 144, an instant messaging broadcast server 148, a channel database 150, and a broadcast database 170. As best shown in FIG. 1B, the channel database 150 comprises a plurality of channel records 152, each of which contains a channel name field 154, a linked-list of subscriber records 155, and a pointer indicating the next subscriber scheduled to receive a message on that channel ("NEXT_SUBSCRIBER") 156. As best shown in FIG. 1C, each subscriber record 155 comprises an address field 157, a last-time-contacted field 158, a knowledgeable subject area field 159, and a pass-by credit ("PASS_CREDIT") score 160. As best shown in FIG. 1D, the broadcast database 170 comprises a plurality of message records 172, each of which comprises a message identifier field 174, a message text field 176, an unanswerable message indicator ("UNANSWERABLE") 178, round count ("ROUND_COUNT") field 180, an answer count ("ACCEPTED_ANSWERS") field 184, a first subscriber contacted ("FIRST_CONTACTED") field 186, and a new request indicator ("NEW_REQUEST") field 188.

In operation, the broadcast system 100 of the present invention broadcasts inquiries to subscribers in series of waves and rounds until the sender receives a valid answer. For example, where there are dozens of people subscribed to a broadcast channel, the broadcast system 100 will first send the inquiry to a first "wave" of subscribers, then another wave, then another wave, until a subscriber answers the inquiry or until every subscriber to the channel receives the inquiry. Each wave in this embodiment will comprise a different handful of subscribers.

If the original sender receives and accepts an answer to the inquiry, the broadcast is halted so that other participants do not waste time with a question that has already been satisfactorily answered. If the original sender does not receive a satisfactory answer, the broadcast system 100 resends the inquiry to the same channel in a new series of waves, together with an indication that the sender did not receive an answer during the first "round" of broadcast waves. If nobody satisfactorily answers the inquiry after the second round of broadcast waves, the broadcast system 100 broadcasts a final round of messages to a small group of people who are most-likely to know the answer.

Some embodiments of the present invention record who was the last subscriber to receive an inquiry. These embodiments use this information to start future waves and rounds with the next person on the channel's subscriber list. In this way, questions that can be answered by almost anyone are spread out among the populace. Some embodiments may also allow for the sender to request a number of 'acceptable' answers and may send the secondary rounds/waves after a short delay to allow for a change in the makeup of people at their terminal.

Figure 2:
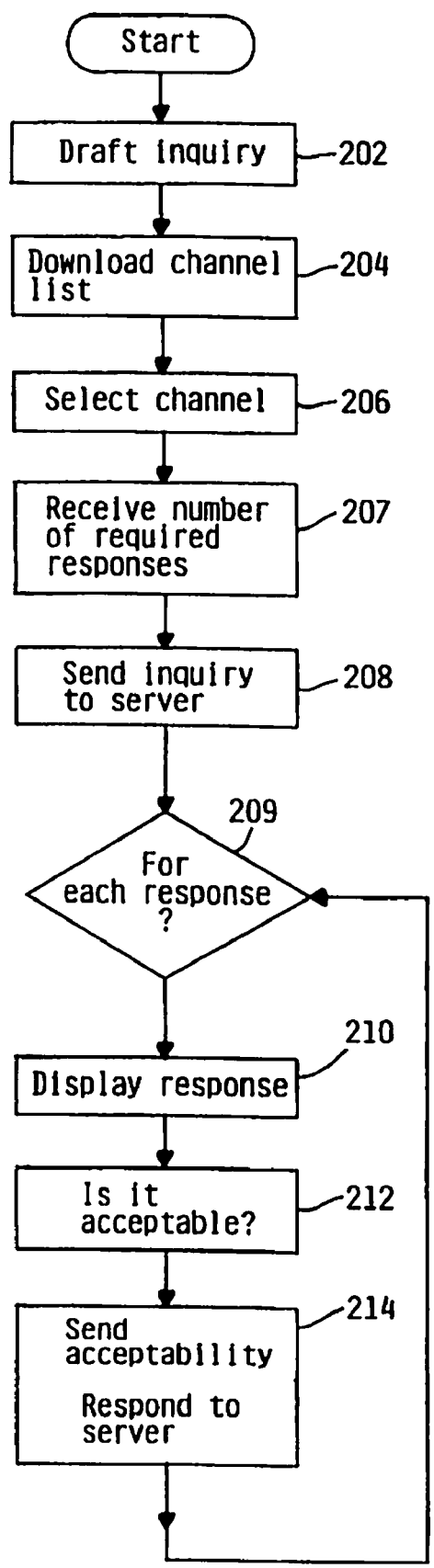
FIG. 2 depicts the operation of a broadcast messaging client embodiment.

FIG. 2 illustrates one embodiment of the instant messaging broadcast client 128 in more detail. The process begins when a user of the system ("sender") drafts an inquiry at block 202. Next, at block 204, the sender instructs their broadcast client 128a to download a list of available channels from the channel database 150 and/or to read a local cache of channel list from memory 112. The sender then selects at least one channel on which to broadcast the inquiry at block 206. In some embodiment, the broadcast client 128a may also include an option to broadcast on "all available channels" and/or to "all subscribers." At block 207, the broadcast client 128 asks the sender how many acceptable answers ("REQUESTED_ANSWERS") are needed. In most cases, the sender's response will be one. However, other values will be appropriate for certain questions, such as "I need six volunteers for a task" or "I have 5 pairs of tickets to give away."

At block 208, the sender instructs the broadcast client 128a to broadcast the inquiry on the selected channel or channels, or onto all channels. In response, the sender's broadcast client 128a transmits the inquiry, the name of the selected channel or channels, and the number of desired answers to the broadcast server 148. As will be discussed in more detail with reference to FIGS. 3-6, the broadcast server 148 rebroadcasts the inquiry to the subscribers to the channel(s) and forwards the responses, if any, back to the sender's client 128a. At blocks 209-212, the sender's broadcast client 128a receives and displays the responses, and then asks the sender whether or not each response answered the question satisfactorily (i.e., was the answer "acceptable"). At block 214, the broadcast client 128a transmits the acceptability of an answer to the broadcast server 148. The broadcast client 128a repeats blocks 209-214 each time it receives a response from the broadcast server 148.

Figure 3:
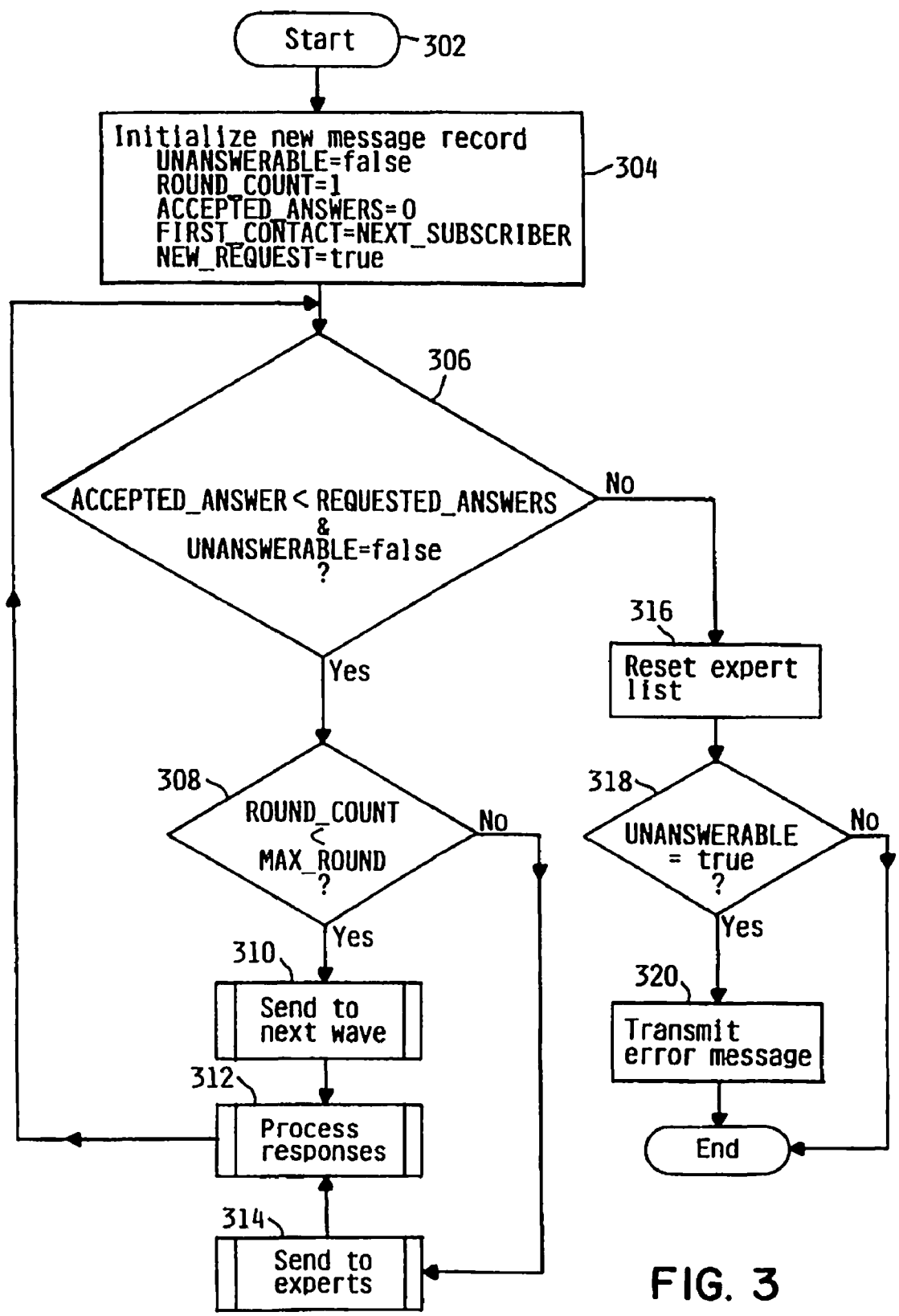
FIG. 3 depicts the operation of a broadcast server embodiment.

FIG. 3 illustrates the instant messaging broadcast server 148 in more detail. At block 302, the broadcast server 148 receives the inquiry from the sender's broadcast client 128a. At block 304, the broadcast server 148 creates a new message record 172n in the broadcast database 170 for the new inquiry. As part of this process, the broadcast server 148 initializes: (i) the UNANSWERABLE flag 178n to 'false' to indicate that the message is not yet considered to be unanswerable; (ii) the ROUND_COUNT counter 180n to '1' to indicate that the broadcast server 148 is beginning to process the first round of waves; (iii) the ACCEPTED_ANSWER count 184n to '0' to indicate that the sender has not accepted any answers at this time; (iv) the FIRST_CONTACT pointer 186n to the individual currently indicated by the channel's NEXT_SUBSCRIBER pointer 156; and (v) a NEW_REQUEST indicator 188n to 'true' to indicate that the broadcast server 148 is beginning to process a new request. Next, at block 310, the broadcast server 148 sends the message to the first wave of subscribers, starting with the subscriber indicated by the NEXT_SUBSCRIBER pointer. The exact number of subscribers in a wave ("MAX_WAVE") can vary, but is usually set by a system administrator to be between about 5-20 recipients or between about 5-25% of the total subscribers to the channel.

At block 312, the broadcast server 148 waits for a recipient to respond to the inquiry and processes the responses, if any. If the sender has not received enough acceptable answers (determined at block 306), the broadcast server 148 repeats blocks 308-312 until it has sent out a number of rounds equal to a maximum number of rounds allowed ("MAX_ROUNDS"), typically two or three rounds. After the broadcast server 148 has broadcast the maximum number of rounds allowed without receiving enough responses (determined at block 308), the server 148 then broadcasts one final round to a group of recipients ("experts") it deems most likely to give an acceptable response at block 314. If this last wave is still unsuccessful, the broadcast server 148 resets the expert list at block 316 transmits an error message back to the sender at blocks 318-320.

Figure 4:
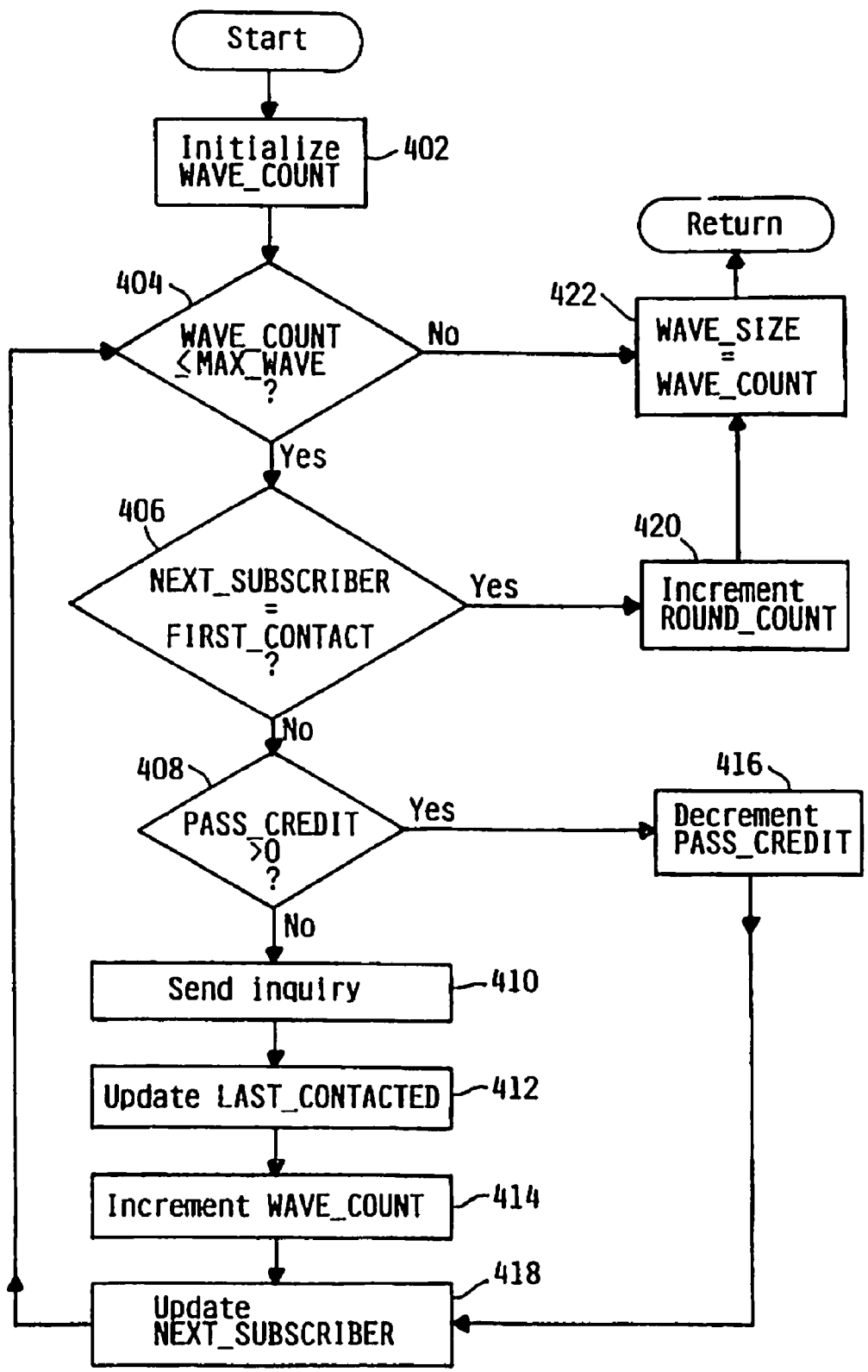
FIG. 4 depicts the operation of the send to next wave block in FIG. 3.

FIG. 4 illustrates the send to next wave block 310 in more detail. At block 402, the broadcast server 148 initializes a counter ("WAVE_COUNT"). At block 406, the broadcast server 148 determines if next candidate recipient ("NEXT_SUBSCRIBER") is the same as the first candidate subscriber to receive this inquiry, as indicated by the FIRST_CONTACT pointer 186n. If so, the broadcast server 148 increments ROUND_COUNT 180n and returns to block 310 in FIG. 3, otherwise the broadcast server continues to block 408.

At block 408, the broadcast server 148 checks the candidate recipient's pass-by credit 160. If the candidate does not have a positive pass-by credit 160, the broadcast server sends the inquiry to that the candidate at block 410, updates that the candidate's last contacted field 158 at block 412, and increments the WAVE_COUNT counter by one at block 414. If the candidate has a positive PASS_CREDIT 160, the broadcast server 148 decrements their PASS_CREDIT by one point at block 416. Next, at block 418, the broadcast server changes the NEXT_SUBSCRIBER pointer to indicate the next subscriber in the channel's list of subscribers 155 at block 418. The broadcast client 148 then repeats blocks 404-418 until it broadcasts to the entire wave (i.e., WAVE_COUNT is greater than MAX_WAVE at block 404) or until has sent the message to the entire subscriber list (i.e., NEXT_SUBSCRIBER=FIRST_CONTACT at block 406). The broadcast client 148 then sets the WAVE_SIZE variable equal to the current WAVE_COUNT variable at block 422, increments ROUND_COUNT at block 420 if the round was determined to be complete at block 406, and then returns to block 310 in FIG. 3.

Figure 5A:
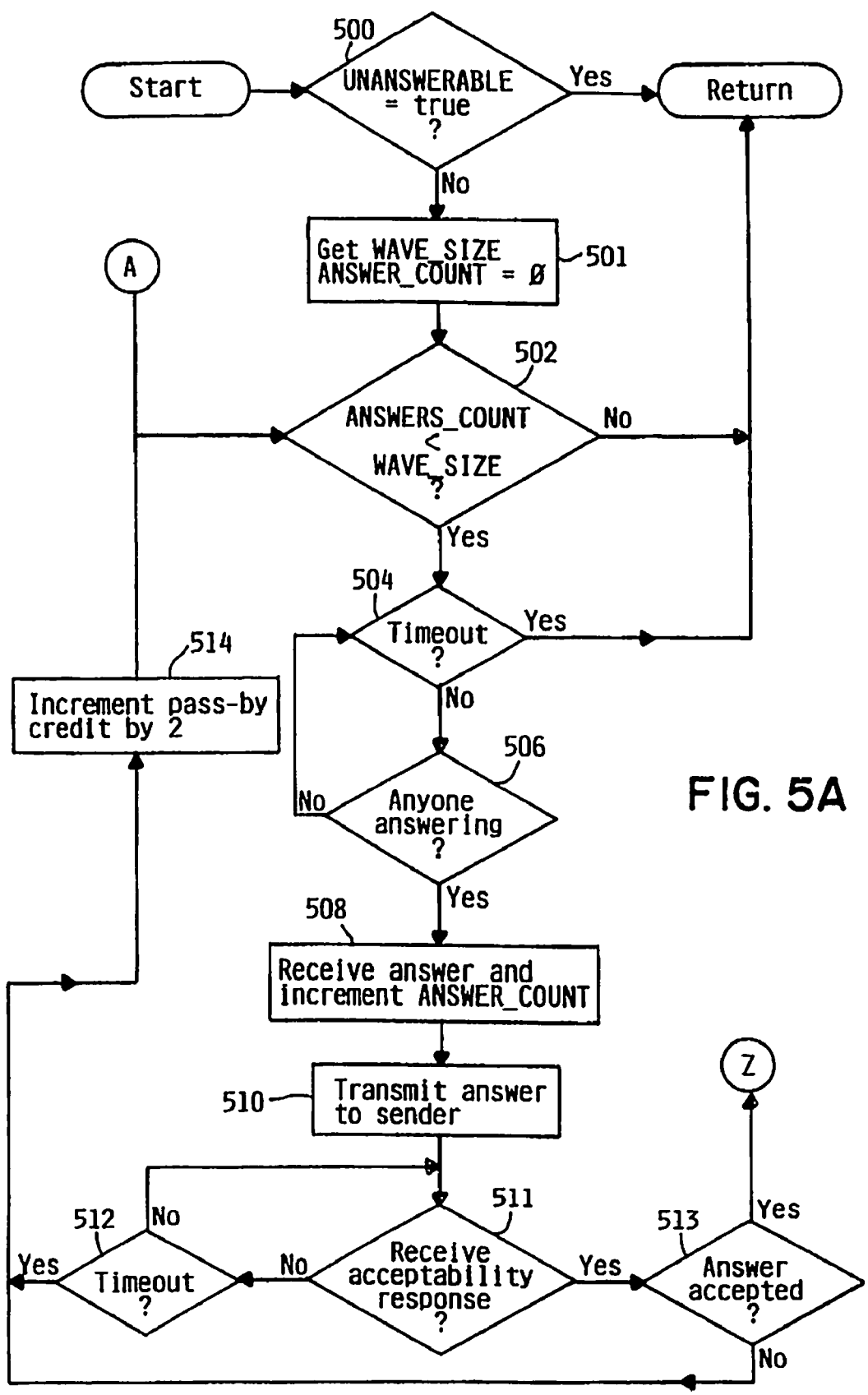
FIGS. 5A and 5B depict the operation of the message processing block in FIG. 3.
Figure 5B:
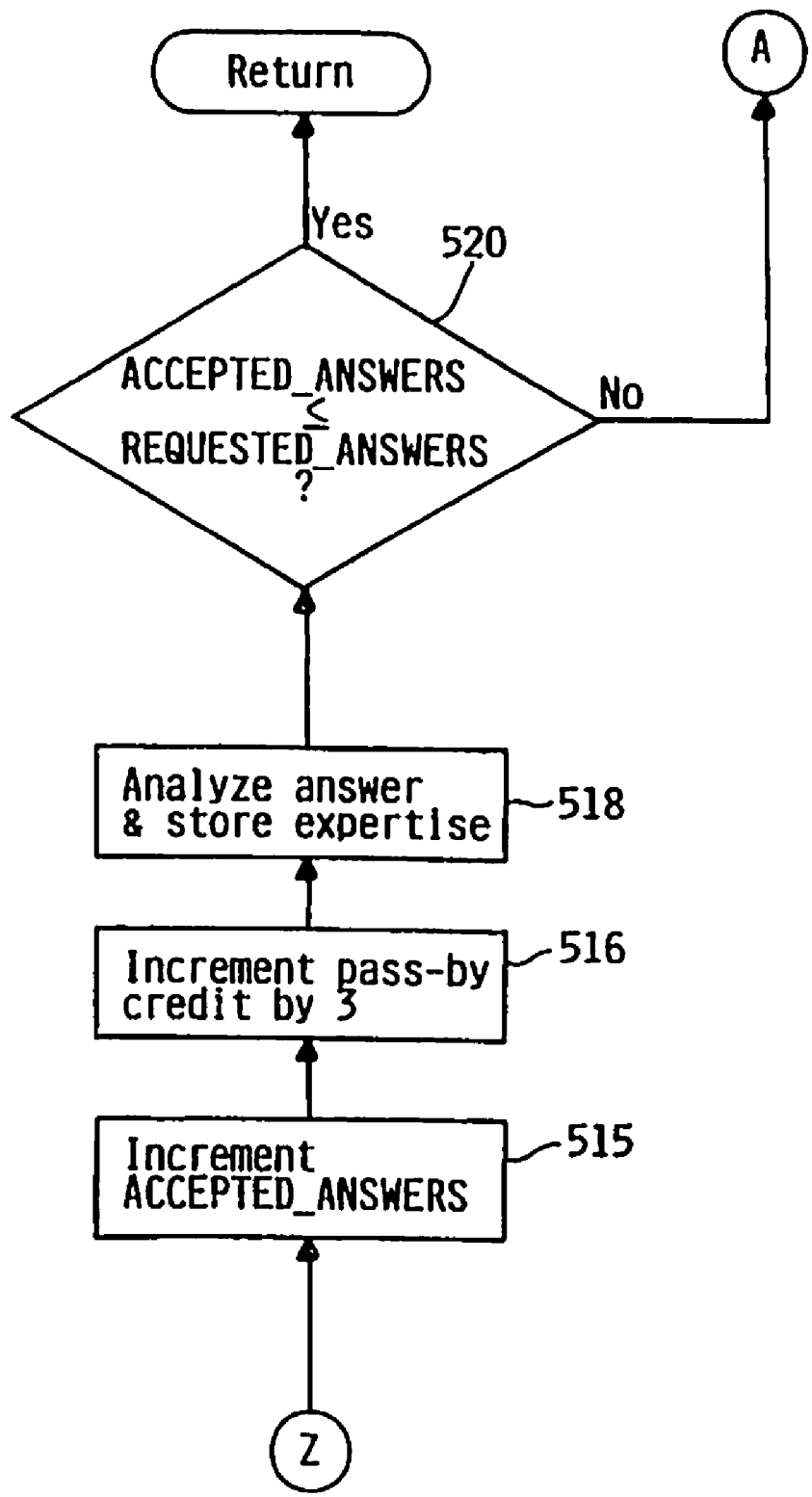

FIGS. 5A and 5B illustrate the message processing block 312 in more detail. At block 500, the broadcast server 148 checks to see if the message is marked as unanswerable. At block 501, if the message not marked as unanswerable (i.e., UNANSWERABLE=false), the broadcast server 148 sets a wave size variable ("WAVE_SIZE") equal to the number of messages sent out in the wave being processed (set in block 310 or block 314) and initializes a counter for the number of answers processed ("ANSWER_COUNT"). Next, at blocks 504-506, the broadcast server 148 waits for a predetermined amount of time to see if any of the recipients of the broadcast wave ("recipients") will start to answer the inquiry. At blocks 508-510, the broadcast server 148 receives a response from one of the recipients, increments ANSWER_COUNT, and forwards the response to the original sender. This action, in turn, causes the sender's broadcast client 128a to display the response on the sender's computer 102a and, as shown in blocks 210-214, to ask the sender whether the response answered their question. The broadcast server 148 then waits for a predetermined amount of time to receive an acceptability response from the original sender at blocks 511-512.

If an acceptability response is received but the answer is not acceptable (determined at blocks 511-513), or if the broadcast server 148 does not receive an acceptability response (determined at block 511), the broadcast server 148 increments the respondent's pass-by credit 160 by two points at block 514 and waits for additional responses. If an acceptability response was received and the answer was acceptable (determined at blocks 511-513), the broadcast server 148 increments the ACCEPTED_ANSWERS counter 184n at block 515, and increments the respondent's pass-by credit 160 by three points at block 516. Next, at block 518, the broadcast server 148 analyzes the acceptable answer to determine its subject matter and stores the result in the respondent's knowledge subject area field 159 (see FIG. 1C). One suitable method for determining the subject matter is to parse the text of the response and/or the original inquiry for keywords, and then storing the keywords in the subject area field 159. However, other methods of determining subject matter are within the scope of the present invention.

After analyzing the accepted answer, the broadcast server 148 determines whether or not the sender has received enough acceptable answers at block 520 (i.e., ACCEPTED_ANSWERS is greater than or equal to REQUESTED_ANSWERS). If the sender has received enough answers, the broadcast server 148 can end its processing of this wave. If not, the broadcast server 148 continues to wait for additional answers at blocks 502-506 for a predetermine amount of time or until it has processed answers from all of the recipients of the wave (i.e., the broadcast server 148 determines if ANSWER_COUNT is less than WAVE_SIZE at block 502, then waits to receive an answer at blocks 504-506), then returns to block 312 in FIG. 3.

Figure 6:
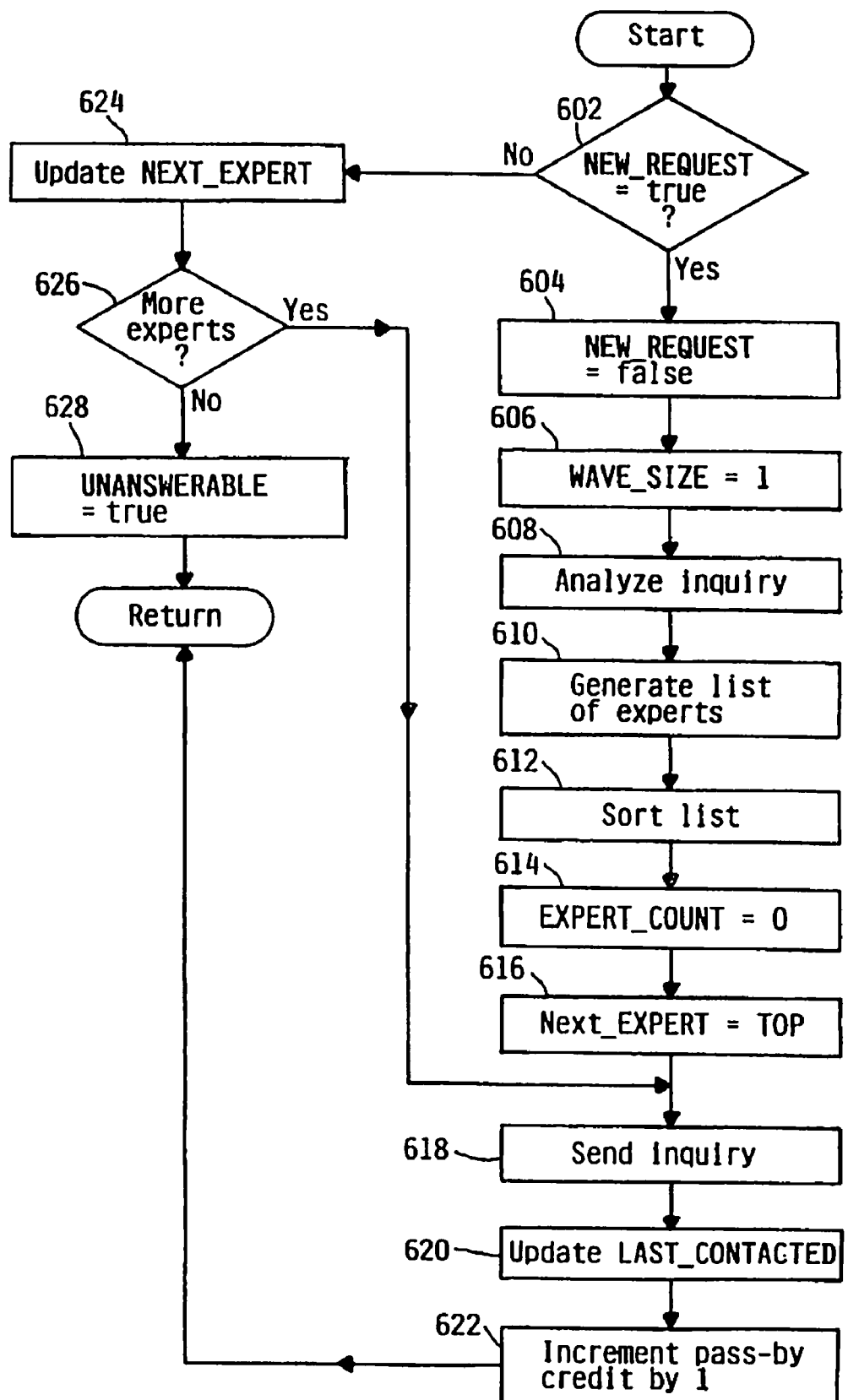
FIG. 6 depicts the operation of the send to best block in FIG. 3.

FIG. 6 illustrates the send to experts block 314 in more detail. If the broadcast server 148 determines at block 602 that this is the first entry into block 314 for the inquiry, it first initializes a number of variables for the expert wave and generates a list of experts. Accordingly, if the broadcast server 148 determines that NEW_REQUEST 188n equals 'true' at block 602, the broadcast server 148 proceeds to set the NEW_REQUEST 188n indicator to 'false' at block 604 and then set the WAVE_SIZE variable to "1" at block 606 to indicate that the messages will be sent to one expert at a time. Next, at block 608, the broadcast server 148 analyzes the inquiry to determine to what subject matter it pertains. The broadcast server 148 then searches at block 610 for a list of subscribers ("experts") who have answered similar questions in the past and/or have had those answers accepted by the sender. For embodiments using keywords, one suitable method for blocks 608 and 610 is to first parse the inquiry for keywords using an appropriate selection algorithm, and then search the channel database 150 for subscribers having similar keywords in their knowledgeable subject matter field 159. Some embodiments may also require that there be a threshold number of common keywords before identifying the subscriber as an expert.

At block 612, the broadcast server 148 then sorts the list of experts identified at block 610, first by lowest pass credit, then by the closest subject matter fit (e.g., closest match between the sets of keywords). At blocks 614-616, the broadcast server 148 initializes a counter for the number of experts to whom it has sent the inquiry ("EXPERT_COUNT") and initializes a pointer ("NEXT_EXPERT") to the first expert in the list. The broadcast server 148 then sends the inquiry to the first expert at block 618, together with an indication that this inquiry is part of the 'expert round.' Next, the broadcast server 148 updates the first expert's last contacted field 158 at block 620, increments the first expert's PASS_CREDIT score by one point at block 622 to credit the subscriber for being an expert, and then returns to block 314 in FIG. 3

If the broadcast server 148 determines at block 602 that this is not first entry into block 314 for the inquiry (i.e., NEW_REQUEST equals 'false'), the broadcast server 148 gets the next expert at block 624 from the sorted list of experts generated at blocks 610-612. If there are experts remaining in the list, the broadcast server 148 then sends the inquiry to the next expert at block 618, together with an indication that this inquiry is part of the expert wave; updates the next expert's last contacted field 158 at block 620; increments the next expert's PASS_CREDIT score by one point at block 622, and then returns to block 314 in FIG. 3. If there are no experts remaining in the list, the broadcast server 148 sets the UNANSWERABLE indicator 178 to "true" at block 628 to indicate that it was unable to find an answer to the inquiry.

Referring again to FIGS. 1A-1C, the processors 110, 130 in this embodiment may be any devices capable of executing the program instructions stored in the main memories 112, 132; and may be constructed from one or more microprocessors and/or integrated circuits. Furthermore, although the computer systems 102, 103 are shown to contain only a single processor and a single system bus, those skilled in the art will appreciate that the present invention may be practiced using a computer system that has multiple processors and/or multiple buses. In addition, the interfaces may each include their own separate, fully programmed microprocessors that are used to off-load compute-intensive processing from the main processors 110, 130.

When the computers 102, 103 start up, the processors 110, 130 initially execute the program instructions that make up the operating systems 124, 144. The operating systems 124, 144 are sophisticated programs that manage the resources of computer systems 102, 103, including: the processors 110, 130; the main memories 112, 132; the mass storage interfaces 114, 134; the I/O interfaces 118, 138; the network interfaces 116, 136; and the system buses 122, 142. The users may enter commands for the operating system using appropriate I/O devices, such as a keyboard or mouse (not shown), connected to the I/O interfaces 118, 138.

The computer systems 102, 103 in this embodiment utilize well-known virtual addressing mechanisms that allow the programs of computer systems 102, 103 to behave as if they have access to a large, single storage entity instead of access to multiple, smaller storage entities such as main memories 112, 132 and a direct access storage device ("DASD") device (not shown). Therefore, while the operating systems 124, 144, the broadcast client 128, the broadcast server 148 and their associated data, are shown to reside in main memory 112, 132, those skilled in the art will recognize that these items are not necessarily all completely contained in main memory 112, 132 at the same time, and may also reside in the virtual memory of other computer systems coupled to the computer system 102, 103.

One suitable server computer 103 is an eServer iSeries® computer running the OS/400® multitasking operating system, both of which are produced by International Business Machines Corporation of Armonk, N.Y. One suitable client computer 102 is a Thinkpad® computer running the Linux™ operating system, both of which are also available from International Business Machines of Armonk, N.Y. However, those skilled in the art will appreciate that the mechanisms and apparatus of the present invention apply equally to any computer system and operating system, regardless of whether the computer system is a complicated multi-user computing apparatus, a single workstation, or an embedded control system. The present invention also applies to other client devices 102 capable of receiving and transmitting user input, including without limitation, pervasive computing devices, such as cellular telephones, personal digital assistants ("PDA"), and the like.

The communication medium 104 can be any device or system that allows the computers 102, 103 to communicate with each other. The network interfaces 116, 136, accordingly, can be any device that facilitates such communication. Suitable communication mediums include, but are not limited to, the Internet, intranets, cellular transmission networks, networks using the IEEE 802.11 specification, and the like. Those skilled in the art will appreciate that many different network protocols can be used to implement the communication medium 104. Transmission Control Protocol/Internet Protocol ("TCP/IP") is an example of a suitable network protocol for Internet communication.

The embodiment described with reference to FIGS. 1-6 uses a client-server network architecture. These embodiments are desirable because the broadcast client 128 can utilize the service of the broadcast server 148 without either computer requiring knowledge of the working details about the other. However, those skilled in the art, will appreciate that other network architectures are within the scope of the present invention. Examples of other suitable network architectures include peer-to-peer architectures and three-tier architectures.

The address field 157 may contain any information capable of identifying resources on the communication medium 104. The message identifier 174, similarly, may contain any information capable of identifying individual broadcast messages. For embodiments using the Internet, the address field 157 may contain an electronic mail address associated with the user. These mail addresses are typically in the form user_name@mail_server_name, where mail_server_name specifies the name of a mail server for the user, and user_name is the name of the user known to the mail server. For embodiments using the cellular telephony networks, the address field 157 may contain the telephone number associated with the pervasive device. Suitable information for the message identifier field 174 includes a serial number and sender/timestamp information.

The present invention offers numerous advantages over conventional broadcast systems. For example, the broadcast system 100 described with reference to FIGS. 1-6 reduces number of times it will interrupt each subscriber by sending inquiries to a subset of subscribers at a time and then halting the broadcast once the sender receives enough acceptable answers. The present invention also reduces interruptions by shifting the broadcast starting point among the subscribers. That is, the present invention will start the broadcast with the individual indicated by the NEXT_SUBSCRIBER pointer 156, which will point at a random subscriber. In addition, the present invention increases the chance that the sender will receive an acceptable answer by ensuring that the broadcast goes to substantially all of the subscribers, and by targeting a final broadcast round at individuals who are most likely to know the answer. Yet another advantage of the present invention is that its pass-by credit system rewards recipients who respond to questions frequently and knowledgeably by directing future questions to others.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a transmission medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

In addition, those skilled in the art will also appreciate that the present invention is suitable for use with communications other than inquiries. For example, the present invention could be used to communicate announcements to an organization, such as "it is your turn to receive your holiday gift." These embodiments may be desirable because the present invention will reduce the peak load on the network associated with the broadcast and because the present invention can encourage employees to come to the physical location in manageable groups.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

What is claimed is:
1. A computer program product, comprising:
(a) a program configured to perform a method a broadcast messaging method, the method comprising:
receiving a message for a plurality of subscribers and a desired number of suitable responses from a sender;
broadcasting the message to subsets of the plurality of subscribers in a first round of waves;

if the sender does not receive the desired number of suitable responses, rebroadcasting the message to subsets of substantially the same plurality of subscribers in a second round of waves;

wherein broadcasting the message to subsets of the plurality of subscribers in a round of waves comprises periodically sending the message to two or more subscribers until substantially all of the plurality of subscribers receives the message; and (b) a tangible, non-transitory, computer readable media encoded with the program.

2. The computer program product of claim 1, wherein the method further comprises:
receiving an answer to the message; and
transmitting the answer to an original sender.

3. The computer program product of claim 2, wherein the method further comprises receiving an approval indication from the original sender.

4. The computer program product of claim 3, wherein the method further comprises tracking the subscriber who sent the approved message.

5. The computer program product of claim 3, further comprising stopping the broadcast if the original sender approves the answer.

6. The computer program product of claim 3, wherein the method further comprises:
receiving a second inquiry; and
transmitting the second inquiry the plurality of subscribers in a series of periodic waves and rounds, wherein the first round of broadcasts of the second inquiry does not include the subscriber who sent the approved message.

7. The computer program product of claim 1, further comprising assigning a pass credit score to each subscriber, and wherein the method further comprises using the pass credit scores to select the first subset of subscribers.

8. The computer program product of claim 7, wherein subscribers are exempted from the selection based at least in part on desirable pass credit score and wherein the desirable pass credit scores comprise a reward for responding to previous inquiries.

9. The computer program product of claim 8, wherein answering an inquiry increases a subscriber's pass credit score.

10. The computer program product of claim 1, wherein the tangible, non-transitory, computer readable media comprises a non-rewritable storage media.

11. The computer program product of claim 1, wherein the tangible, non-transitory, computer readable media comprises a writable storage media.

12. The computer program product of claim 1, wherein the second round comprises subscribers who are more likely to have a satisfactory answer.

13. The computer program product of claim 1, wherein the message comprises an instant message transmitted over the Internet.

14. A message broadcast system, comprising:
a processor;
a memory coupled to the processor; and
a broadcast server stored in the memory and executable on the processor, wherein the broadcast server is adapted to
receive a message for a plurality of subscribers and a desired number of suitable responses from a sender;
broadcast the message to subsets of the plurality of subscribers in a first round of waves;
if the sender does not receive the desired number of suitable responses, rebroadcast the message to subsets of substantially the same plurality of subscribers in a second round of waves; and
wherein broadcasting the message to subsets of the plurality of subscribers in a round of waves comprises periodically sending the message to two or more subscribers until substantially all of the plurality of subscribers receives the message.

15. The broadcast messaging system of claim 14, further comprising a first broadcast client that transmits the message to the broadcast server.

16. The broadcast messaging system of claim 15, further comprising a second broadcast client that receives the message from the broadcast server.

17. The broadcast messaging system of claim 14, wherein the message comprises an instant message.

18. A computer program product, comprising:
(a) a program configured to perform a method of polling a plurality of subscribers to a broadcast messaging system, the method comprising:
receiving an inquiry from a sender;
broadcasting the inquiry to groups of the plurality of subscribers in a first series of waves,
receiving an answer to the inquiry from one subscriber;
transmitting the answer to the sender; and
rebroadcasting the inquiry to groups of substantially the same plurality of subscribers in a second series of waves if the sender does not approve the answer;
wherein broadcasting and rebroadcasting the message to groups of the plurality of subscribers in a series of waves comprises repeatedly sending the message to two or more subscribers until substantially all of the plurality of subscribers receives the message; and
(b) a tangible, non-transitory, computer readable media encoded with the program.

\* \* \* \* \*